Patented Jan. 29, 1924.

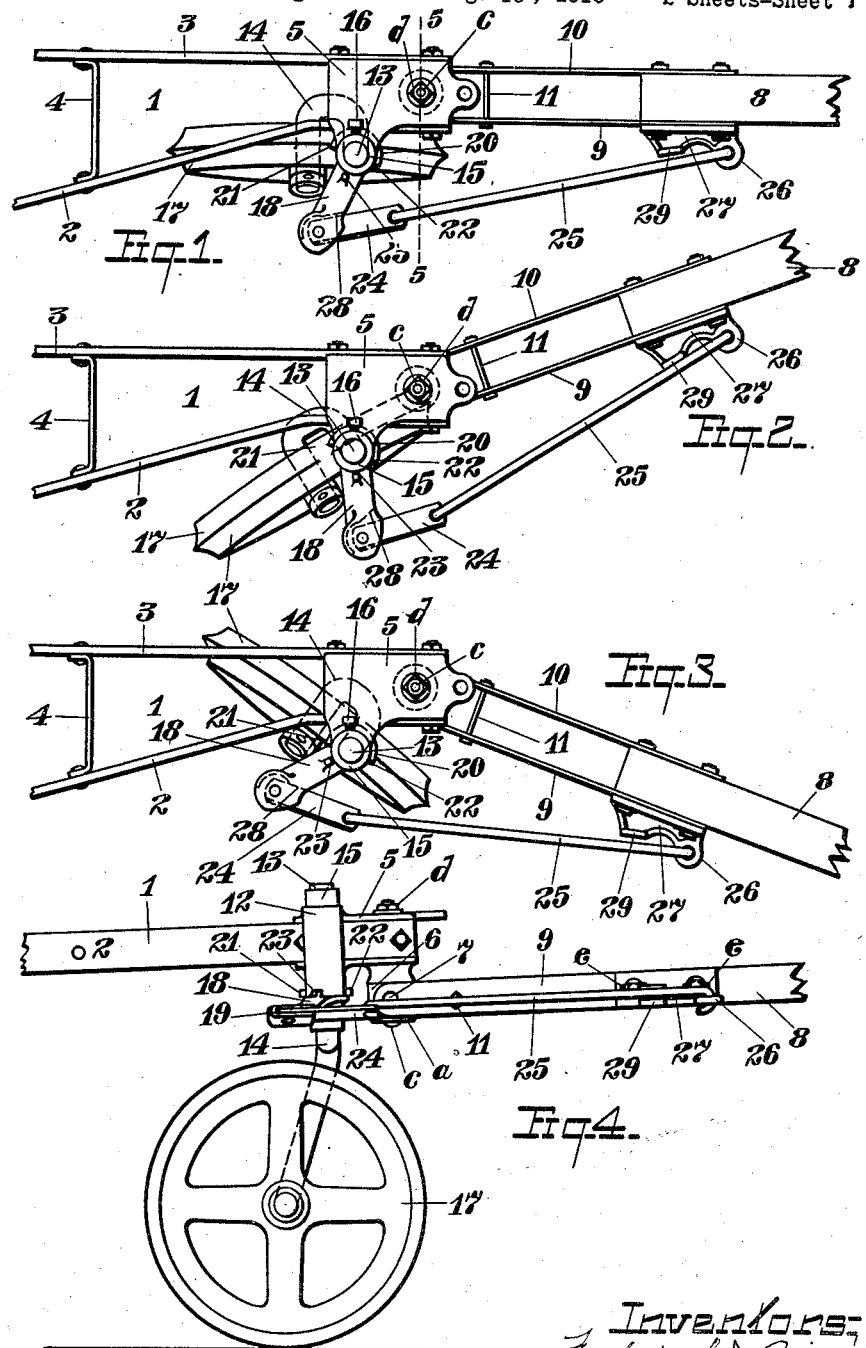

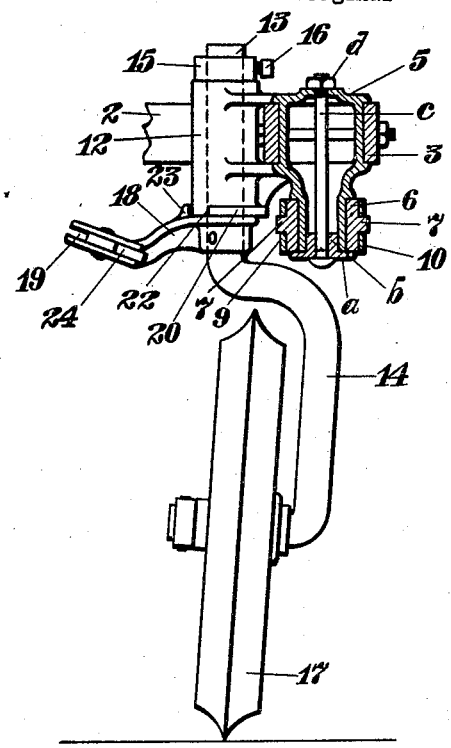

1,482,057

UNITED STATES PATENT OFFICE.

FREDERICK D. WILSON AND OSCAR F. CARLSON, OF MOLINE, ILLINOIS, ASSIGNORS TO DEERE AND COMPANY, OF MOLINE, ILLINOIS, A CORPORATION OF ILLINOIS.

TONGUE TRUCK.

Application filed August 15, 1916, Serial No. 115,032. Renewed November 6, 1920. Serial No. 422,384.

*To all whom it may concern:*

Be it known that we, FREDERICK D. WILSON and OSCAR F. CARLSON, citizens of the United States, residing at Moline, in the county of Rock Island and State of Illinois, have invented certain new and useful Improvements in Tongue Trucks, of which the following is a specification, reference being had therein to the accompanying drawing.

Our invention relates to trucks employed as part of draft mechanism applied more particularly to agricultural machinery.

Our device is a truck having one wheel only, and our object is to so connect the latter to the draft mechanism of a machine, more especially of an agricultural type, that when the machine is turned the truck will be liberated from its set straight ahead position to freely follow the turning movement, castering within certain limits; we do not, however, desire to be limited to one wheel only, as it is entirely possible to so construct our device that two wheels may be used.

Referring to the drawings in which similar numerals indicate identical parts—

Figure 1 is a plan view of part of a support and pole with our invention connected thereto.

Figure 2 is a plan view showing position of the parts when turning to the left.

Figure 3 is a plan view showing the position of the parts when turning to the right.

Figure 4 is a side elevation.

Figure 5 is a section on the line 5—5 of Figure 1.

Figure 6 is a detail of part of the mechanism by which the wheel support is actuated.

Figure 7 is a horizontal detail section of pivotal connection of the support and pole, and Figure 8 is a detail of a member of the pole from which connection is made to the wheel support.

A support 1, adapted to be connected to a machine, is shown in part, and preferably consists of bars 2 and 3 spaced apart intermediate their length by a brace 4, and having their forward ends securely bolted to a member 5. The member 5 extends below the bars 2 and 3 where it is cylindrical in form with a reduced diameter at its end for the reception of a collar 6 having on opposite sides thereof studs or projections 7; the collar 6 is free to turn on the member 5 and is retained thereon by a plate *a* having a central extension *b* which fits within the cylindrical portion of the member 5 and is held firmly in place by a bolt *c* which passes upward through a perforation in the plate *a* and extension *b* and through the top of the member 5 above which it is secured by a nut *d*. The pole comprises the pole proper 8 to the rear end of which, and on opposite sides, are bolted rearwardly extending parallel bars 9 and 10 having suitable perforations at their rear terminals which engage with the studs 7; the bars 9 and 10 are prevented from disengagement from the studs 7 by a bolt 11 passed through both bars, by this construction the pole 8 has a vertical movement pivoting on the studs 7, and a horizontal movement through the collar 6 mounted to turn on the member 5.

Preferably integral with the member 5 is a vertical cylindrical portion forming a bearing 12 in which is journaled the spindle end 13 of a crank axle 14 which is held in place by a collar 15 secured on the spindle 13, above the cylindrical portion, by a set screw 16. The crank axle 14 is bent intermediate its length to extend toward the support 1, and is then bent downwardly and terminates in a horizontal portion on which is mounted a wheel 17.

Rigidly secured upon the crank axle 14, and extending laterally to the right of the support 1, is an arm 18, having in its outer end a recess 19 which is declined toward the spindle 13 for a purpose hereinafter described. On the lower end of the bearing 12 is a flange 20 cut away to present shoulders 21 and 22 against which a lug 23 on the arm 18 is adapted to contact. Pivoted in the recess 19 is a link 24, its forward end having a perforation in which is hooked an end of a rod 25, the opposite and forward end of which engages with an eye 26 on a member 27 the latter being preferably a casting secured on the pole 8 by the same bolts which attach the bars 9 and 10 thereto; said bolts extending through slots *e* in the member 27 so that the latter can be adjusted along the pole to give the wheel 17 more or less lead or angular relation to the line of draft.

In Figure 1 the truck is shown in position when the machine to which it is attached is being drawn straight ahead, the link 24 and rod 25 being in a direct line with each other act practically as one rod; as stated before, the recess 19 declines toward the spindle 13 consequently the link 24 has a similar declination sidewise and a tendency to swing toward the spindle 13, making the connection of the link 24 and rod 25 practically a lock joint, when the link 24 is in contact with the side 28 of the recess 19, which will not break readily except by an applied force; to prevent the joint of the link 24 and the rod 25 breaking toward the support 1, the link 24 is adapted to contact with the left side 28 of the recess 19, and the rod 25 contacts with a shoulder 29 on the member 27 and rearward of the pivotal connection of the rod therewith.

It is presumed that a turn is to be made to the left as shown in Figure 2; as the pole 8 is swung the relative position of the rod to the pole is maintained by the contact of the rod 25 with the shoulder 29. As the turn of the pole 1 is continued the arm 18 is drawn forward rotating the axle 14, and as the rod 25 is rigid the link 24 is turned to the right on its pivot, thus breaking the lock joint of the rod 25 therewith, the wheel at this time assuming the position shown in Figure 2, but being free to caster toward the line of draft and back to the position shown in Figure 2, the castering movement being limited by the shoulders 22 and 29.

After the lock joint of the link 24 and rod 25 is broken, the axle 14 is free to rotate for a limited distance and the wheel 17 will swing to follow the draft, the angle the wheel will assume with relation to the draft pole depending upon the sharpness of the turn, the axle 14 being free to rotate, its rotation being limited by the shoulder 22 and the side 28 of the recess 19. As the support 1 and pole 8 are again in line on a straight course the parts described again assume the position shown in Figure 1. As shown in Figure 3 in making a turn to the right the arm 18 is forced backward by the push of the rod 25 and link 24, as the pole is swung, until the side 28 of the recess 19 has moved the link 24 out of alignment with the rod 25 thus breaking the joint of the latter with the link 24 and leaving the axle 14 again free to rotate toward the line of draft and back to the position shown in Figure 3, the rotation being limited by the shoulder 22 and the side 28 of the recess 19, the parts returning to the position shown in Figure 1 when the support 1 and pole 8 are again in line for a straight advance.

As heretofore constructed trucks of this type have been absolutely controlled in movement by the swing of the pole, in our device however the wheel is swung part way by the swing of the pole or until the joint of the link 24 and rod 25 is broken allowing the wheel to assume any angle of travel in the direction of the turn in one direction only and avoiding any possibility of upsetting. It will be apparent that by transferring the parts, from the right of the tongue and pole, to the left, the wheel will be as free to swing for a limited distance to the right as it is permitted to swing to the left as shown in the drawings. In whatever direction the turn is made the wheel swings to a greater angle to the line of draft than the pole, materially aiding in shortening the turn.

What we claim is:

1. The combination of a draft device arranged to normally exert draft on a central draft line and laterally movable to exert draft on lines inclined to the line aforesaid, a support connected to the draft device, a ground engaging steering wheel oscillatable relatively to the support from a normal central line to a predetermined limit, and a power transmitter with two inter-engageable elements, one carried by the frame and the other carried by the draft device and arranged to positively oscillate the said wheel relatively to the support through part of the path to said limit, the wheel being freely oscillatable through the remainder of the path to said limit.

2. The combination of a draft device arranged to normally exert draft on a central draft line and laterally movable to exert draft on lines inclined to the line aforesaid, a support connected to the draft device and normally drawn thereby along said central line, a ground engaging steering wheel movable bodily horizontally relatively to the support between pre-determined limits on opposite sides of said normal central draft line, and a power transmitter with two inter-engaging elements, one carried by the support and the other by the draft device and adapted to positively move the said wheel bodily relatively to the support through paths shorter than the distance between said limits, the wheel being freely oscillatable through the remainder of the paths to said limits.

3. The combination of a support, a laterally movable draft device arranged to normally exert draft on a central draft line, a wheel carrier having a ground engaging steering wheel arranged to swing bodily horizontally relatively to the support between pre-determined limits, means interposed between the draft device and the wheel carrier to hold the wheel normally to follow said draft device and operable by lateral movement of the draft device to swing said wheel bodily relatively to the support through paths shorter than the distance between said limits, and means for automatically rendering said last mentioned means inactive at predetermined points between said limits.

4. The combination of a support, a draft device normally exerting draft on a central draft line and pivotally connected to said support for lateral movement, a wheel carrier mounted on said support and having a ground engaging steering wheel arranged to swing bodily horizontally relatively to the support between pre-determined limits, means interposed between the draft device and the wheel carrier to hold the wheel normally to follow said draft device and operable by lateral movement of the draft device to swing said wheel bodily relatively to the support through paths shorter than the distance between said limits, and means for automatically rendering said last mentioned means inactive at predetermined points between said limits.

5. The combination of a support, a draft device, normally exerting draft on a central draft line and pivotally connected to said support for lateral movement, a wheel carrier having a ground engaging steering wheel arranged to swing bodily horizontally relatively to the support between predetermined limits, means inter-posed between the draft device and the carrier to lock the wheel in position to follow said draft device on a normal line of advance and operating to swing said wheel bodily relatively to the support through paths shorter than the distance between said limits, and means on the draft device to automatically break the lock between said limits to permit the wheel to swing freely.

6. The combination of a support, a draft device normally exerting draft on a central draft line and pivotally connected to said support for lateral movement, a wheel carrier having a ground engaging steering wheel arranged to swing bodily horizontally relatively to the support between pre-determined limits, means interposed between the draft device and the carrier to lock the wheel in position to follow said draft device on a normal line of advance and operating to swing said wheel bodily relatively to the support through paths shorter than the distance between said limits, and means on the carrier to automatically break the lock between said limits to permit the wheel to swing freely.

7. The combination of a support, a draft device normally exerting draft on a central draft line and pivotally connected to said support for lateral movement, a ground engaging steering wheel carried by said support and arranged to swing bodily horizontally relatively thereto between pre-determined limits, means interposed between the draft device and the wheel to lock the latter in position to follow said draft device on a normal line of advance and operating to swing said wheel bodily relatively to the support through paths shorter than the distance between said limits, means to automatically break said lock to permit the wheel to swing freely, and means to automatically re-lock said locking means when the draft device is moved laterally to a central draft line.

8. The combination of a support, a draft device arranged to normally exert draft on a central draft line and laterally movable to exert draft on lines inclined to said central draft line, a ground engaging steering wheel carried by said support and adapted to be swung bodily relatively to said support within pre-determined limits, means interposed between said draft device and wheel and operable to swing said wheel bodily by lateral movement of the draft device and at greater speed relative thereto, and means adapted automatically to free said wheel for independent movement.

9. The combination of a support, a draft device pivotally connected thereto for lateral movement, a wheel carrier rotatably mounted in a bearing on said support, an arm extending laterally from said carrier and rigidly secured thereto, a link pivotally secured on said arm, a rod pivotally connected to said link and extending forwardly to pivotal connection with the draft device, said link and rod being in alinement when the draft device and wheel are moving ahead and when the draft device is moved laterally a pre-determined distance, means to break said alinement to permit said wheel to swing independently of the draft device when said distance is exceeded, and means to restore said alinement when the draft device and wheel are in a straight ahead movement.

10. The combination with a support, a draft device pivotally connected thereto for lateral movement, a wheel carrier having a vertical pivot journaled to rotate in a bearing on said support and having a ground engaging steering wheel, means rigidly connecting the draft device and wheel to control the latter during a forward movement and when the draft device is swung laterally to a predetermined limit, means to automatically break the connection of the draft device with the wheel whereby the latter is free for independent movement when said limit is exceeded, and means to automatically restore the rigid connection of the draft device with the wheel when both of the latter are swung to a straight line of draft.

11. The combination of a support, a draft device pivotally connected thereto for lateral movement, a wheel carrier having a vertical pivot rotatably journaled in a bearing on said support and having a ground engaging steering wheel, an arm extending laterally from said pivot and rigidly secured thereto, means connecting said arm and draft device in rigid relation when moving straight ahead and when the draft device is swung to a pre-determined limit, means to break said rigid connection to permit independent swinging of said wheel when said limit is exceeded, and means to automatically and rigidly re-connect said draft device and arm when both the latter are swung to position for a straight advance.

12. The combination of a support, a draft device pivotally connected thereto for lateral movement, a wheel carrier rotatably mounted on said support and carrying a ground engaging steering wheel, an arm extending laterally from said carrier and rigidly secured thereto, a link pivotally mounted on the free end of said arm and having its pivot inclined toward the carrier, a rod connected to said link and extending forwardly to pivotal connection with the draft device, said link and rod being in alinement when the pole and wheel are moving ahead and when the draft device is swung laterally a pre-determined distance, and means to break said alinement to permit the wheel to swing independently of the draft device when said distance is exceeded, said link and rod being adapted to be automatically returned to said alignment.

13. The combination of a support, a draft device pivotally connected thereto for lateral movement, a wheel carrier rotatably mounted on said support and carrying a ground engaging steering wheel, an arm extending laterally from said carrier and rigidly secured thereto, a forwardly extending link pivotally mounted on said arm, a rod pivotally connected to said link and extending forwardly to pivotal connection with the draft device, said link and rod being in alinement when the draft device and wheel are moving ahead and when the draft device is swung laterally a pre-determined distance, and means on the draft device to break said alinement to permit the wheel to swing independently of the draft device when the latter is swung said distance in one direction.

14. The combination of a support, a draft device pivotally connected thereto for lateral movement, a wheel carrier rotatably mounted on said support and carrying a ground engaging steering wheel, an arm extending laterally from said carrier and rigidly secured thereto, a forwardly extending link pivotally mounted on said arm, a rod pivotally connected to said link and extending forwardly to pivotal connection with the draft device, said link and rod being in alinement when the draft device and wheel are moving ahead and when the draft device is swung laterally a pre-determined distance, means on the draft device to break said alinement to permit the wheel to swing independently of the draft device when the latter is swung said distance in one direction, and means on the carrier to break said alinement to permit the wheel to swing independently of the draft device when the latter is swung in an opposite direction.

In testimony whereof we affix our signatures, in presence of two witnesses.

FREDERICK D. WILSON.
OSCAR F. CARLSON.

Witnesses:
JESSIE SIMSER,
W. G. DUFFIELD.